INVENTOR.
ALVIN A. ROOD
BY
Richey & Watts
ATTORNEYS

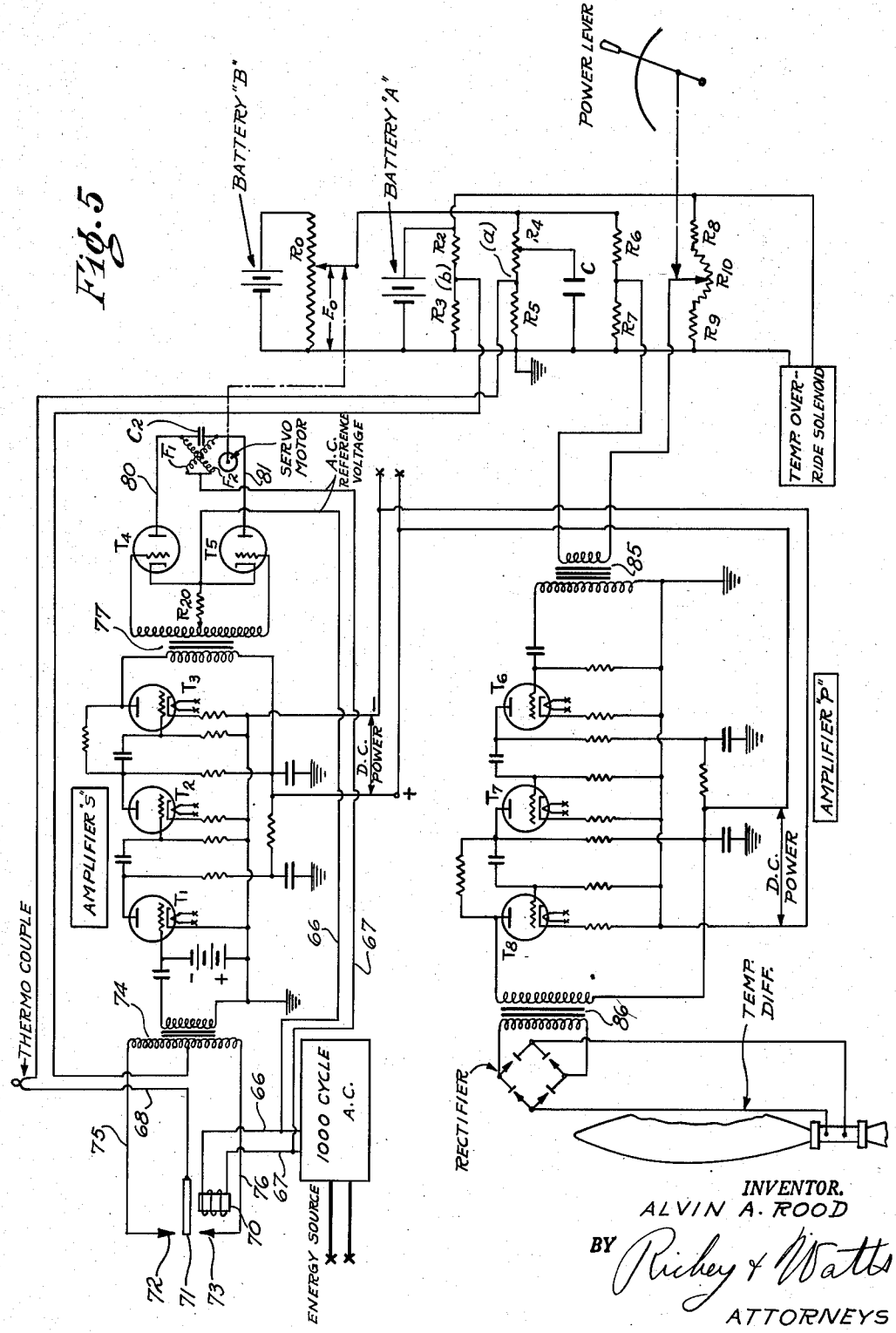

UNITED STATES PATENT OFFICE 2,632,996

MANUALLY ADJUSTABLE SPEED AND TEMPERATURE REGULATING APPARATUS FOR COMBUSTION ENGINES

Alvin A. Rood, Cleveland, Ohio, assignor to The Weatherhead Company, Cleveland, Ohio, a corporation of Ohio Application November 23, 1946, Serial No. 711,961

1 Claim. (Cl. 60—39.28)

This invention relates generally to means of controlling the operating conditions of an internal combustion engine such as that of a gas turbine engine used in aircraft. More particularly, this invention relates to novel means of control which includes speed regulation in accordance with a selected speed value, simultaneously with automatic regulation of combustion chamber temperature in accordance with a selected temperature value.

It is an object of this invention to permit rapid and accurate adjustment of turbine speed, which adjustment will remain constant under all operating conditions and which speed regulating arrangement operates in conjunction with means for maintaining the temperature within the combustion chamber at a predetermined selected value. I accomplish these objects by either of two systems. In one system I employ a speed sensing device which responds to differences between the actual speed of the turbine and a selected speed, which differences are used to correct the speed by an automatic adjustment of the throttle.

In conjunction with this apparatus in the first system I may employ a temperature measuring unit that determines the difference between actual combustion chamber temperature and a preselected temperature and uses such difference to increase or decrease the load on the engine thereby correcting actual temperature to selected temperature. One means of changing the load that I contemplate is that of modifying the pitch of a variable pitch propeller by means of energizing an electric motor in accordance with the dictates of the apparatus.

In the second embodiment of my invention I contemplate employment of the speed sensing system to operate the electric motor in the variable pitch propeller to change the load in order to hold the speed constant. In this same embodiment I may employ the temperature comparing unit to activate mechanism which adjusts the throttle in order to hold temperature within the combustion chamber constant.

A further object of this invention is the automatic adjustment of the fuel supply or load to compensate for variations in engine operating conditions caused by changes in altitude and by changes of engine efficiency with speed.

A further object is a direct measurement of temperature existing within the combustion chamber or existing within any container so that the measured temperature represents the present instantaneous temperature of the medium. This is particularly important in internal combustion engines such as gas turbines and the like. Temperatures can rise several hundred degrees in a matter of seconds in these engines and, if they are operating near peak load, such a rise in temperature can damage the engine if not corrected immediately. Difficulty has been experienced in using thermostats or thermocouples and the like to measure rapidly the true temperature of hot gases, etc., because there is an inherent lag to the laws of heat transfer, which results in the fact that the measured temperature under changing conditions is never quite equal to the true temperature. With these problems in mind, it is an object of this invention to provide a lag correcting means which determines the true temperature existing within the medium or within the combustion chamber almost instantaneously even though the actual measuring device is subject to lagging operation due to heat transfer laws as just described.

A further object lies in the provision of temperature sensitive means to reduce the fuel supply to the turbine or engine when the absolute temperature within the combustion chamber exceeds a certain maximum value. I am able to accomplish this object by use of a valve controlled by my novel lag corrector circuit in conjunction with certain other circuits so that the instantaneous value determined by the thermocouple or other instrument and the lag corrector circuit equals the true temperature within the medium.

These and other objects will be apparent to those skilled in the art as the following detailed description of the two embodiments of my device proceeds.

In the drawings:

Fig. 5 is a schematic circuit diagram showing additional details of the electric circuit.

Figure 1:
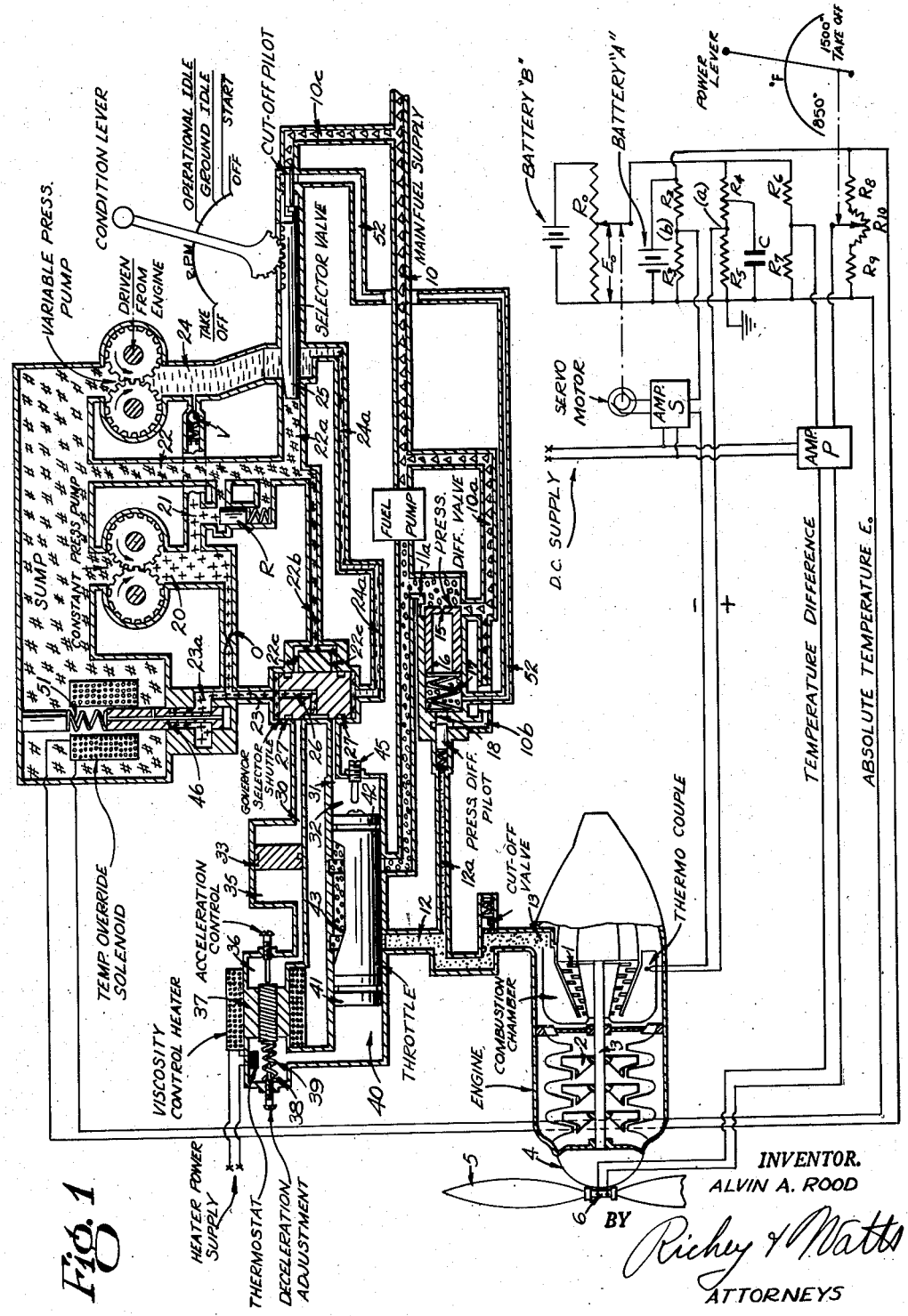
Fig. 1 is a schematic view of one embodiment of my turbine control.

In the modification shown in Fig. 1, there is a hydraulic circuit which controls the throttle in such a manner as to maintain the speed of the turbine constant representing a given setting of the manually controlled condition lever. The speed itself is selected by the condition lever in accordance with the work to be done and the actual speed attained by the engine is sensed by a variable pressure pump driven by the engine, which pump is part of a hydraulic control mechanism that automatically adjusts fuel flow until the selected speed is attained.

The constant speed hydraulic circuit which controls the fuel flow operates in conjunction with an electric circuit which controls the load in a novel manner so that the temperature in the combustion chamber of the engine is maintained at a pre-selected value. Basically, this is accomplished by measuring the temperature in the combustion chamber, correcting it for heat transfer lag, comparing the corrected temperature with the selected temperature, causing any difference therein to increase or decrease pitch of the propeller thereby increasing or decreasing the load proportionately. For example, if the actual temperature is higher than the selected temperature the novel arrangement hereinafter described will automatically decrease the pitch of the propeller thereby decreasing the load on the turbine and cause the temperature in the combustion chamber to drop. This arrangement is particularly effective because it is in combination with the constant speed fuel supply circuit. This combination makes it possible to compensate automatically for differences in engine operating conditions due to variations in altitude and also variations of fuel requirements due to changes in engine efficiency.

To understand the interaction between the load control circuit responsive to temperature and the constant feed fuel supply circuit, assume first that fuel supply is not governed as to produce a constant speed but is merely governed by a manually controlled throttle, the setting of which remains unchanged. Now, assume that temperature in the combustion chamber exceeds the selected temperature and that the actual temperature in the chamber can be measured as a voltage, for example, compared with a voltage which represents the selected temperature. The difference between these voltages then represents the difference between the selected and the actual temperature and it is contemplated that this difference could be amplified and used to operate an electric motor to decrease the pitch of the propeller. When this happens, with a constant fuel supply the engine would speed up, more air would be pumped into the combustion chamber and the temperature would drop. Now, if we inserted a constant speed circuit and fuel supply line, it can be seen that this increase in speed would be sensed by the constant speed mechanism and would result in an immediate reduction in the amount of fuel supplied to the turbine so that the speed will actually be held constant, but due to the decrease in fuel supply the temperature would drop. Thus, we have satisfied the problem set up by the basic assumption and also have held speed constant. It can be seen that with the novel combination of controls described generally at this point it is not only possible to select and maintain the temperature in the combustion chamber, but also to maintain and select the speed of the turbine, a result which has heretofore presented a difficult problem without a satisfactory solution.

The fluid circuits can be divided into three major divisions, first, the fuel circuit itself; second, the hydraulic control or servo circuit; and third, the sealed throttle actuating circuit. Although I have illustrated diagrammatically one type of engine which may be employed, it will be understood that I have merely done this to illustrate an application of my invention, and although the jet or turbine engine presents certain special problems which are solved by my apparatus, I do not limit myself to utilization of my novel control means with any one engine design unless said design is claimed. The engine may have a gas turbine 1 which is driven by burning of fuel mixed with air in the combustion chamber. One or more air pumps 2 may be driven by the turbine shaft 3 to supply the necessary air. The turbine shaft usually drives a gear reduction unit 4 which turns the propeller 5. I contemplate the use of a variable pitch propeller, one form of which may have an electric motor to change propeller pitch indicated generally at 6.

The main fuel supply line 10 connects to the fuel pump which may be a positive displacement pump and which supplies fuel under pressure to line 11. The throttle is automatically positioned as will be described presently and acts to determine the amount of fuel which flows into line 12 and hence into the combustion chamber at 13. A cut-off valve spring, urged to a closed position, is normally held open by the fuel pressure but if that pressure drops below a predetermined value the cut-off valve will close and prevent fuel from entering the combustion chamber at low pressures. In order to make the amount of fuel which flows into the combustion chamber a direct function of throttle position independent of fuel pump pressure and of the orifice resistance in the chamber, it is desirable to have a constant pressure drop occur across the throttle. In order to accomplish this, a constant pressure difference valve and a pressure difference pilot are provided. The pressure difference valve fits in a cylinder one end of which connects by line 11a to the throttle inlet line 11. The valve has a small orifice 15 which permits pressure in chamber 16 behind the valve to gradually build up and almost equal that in line 11a. Spring 17 urges the constant pressure difference valve to the right to restrict the by-pass into line 10a fluid from line 11, so that the higher the pump pressure the greater the by-pass. A line 12a leads from the throttle outlet 12 and fuel in this line is at the pressure necessary to force fuel through the nozzle in the engine. Pressure in line 12a urges a pressure difference pilot to the right in the drawing so that it tends to close off the passageway 18 and hence tends to seal off the left end of the constant pressure difference valve.

Assume that for some reason or other pressure of the fuel entering the combustion chamber through passageway 12 does not change but that fuel pressure in passageway 11 from the pump increases. The increase in pressure in line 11 will cause the constant pressure difference valve to move to the left which will tend to by-pass high-pressure fuel by means of line 11a into the low-pressure line 10a, thus reducing pressure in line 11. The valves are designed so that this action continues until the pressure difference between lines 11 and 12 is at the predetermined value substantially independently of by-pass quantity. Assume now that the pressure in line 11 from the fuel pump remains constant but that pressure in line 12 from the throttle increases, due to a restriction in the nozzle, for example. It will be noted that a certain amount of fluid from line 11a always tends to pass through orifice 15 in the pressure difference valve and pressure within the chamber 16 and behind the valve tends to equal the pressure in the high-pressure fuel line 11. Under normal operating conditions the pressure difference pilot does not completely close off passageway 18 so that passageway 18 can communicate with a line 10b connected to the low-pressure side of the fuel pump. However, due to the throttling action at the pressure difference pilot there will be a pressure built up behind the pressure difference valve which pressure will augment the force of spring 16 tending to move that valve to the right and tending to shut off the by-pass between chamber 11a and low-pressure line 10a. Now, if the pressure increases in line 12, it is necessary to increase the pressure in line 11 an equal amount to maintain a constant pressure drop across the throttle. This is accomplished as the pressure difference pilot moves to the right under the increased pressure in line 12a, tending to restrict the exhaust from chamber 18 into the low-pressure line 10b and causing more pressure to build up behind the constant pressure difference valve. That valve now moves to the right and decreases the by-pass from line 11a into the low pressure line 10a. The valves are arranged so that this action continues until pressure from the fuel pump in line 11 increases by the same amount that the pressure in the nozzle line 12 was increased. Thus, it can be seen that the constant pressure difference valve will maintain a constant pressure drop across the throttle regardless of whether there is a pressure change in the fuel pump line 11 or in the delivery line 12 to the engine, or in both lines. With this arrangement throttle throw is a function only of throttle area because of the constant pressure drop.

Having completed the description of the fuel feed circuit, the hydraulic control pressure circuit and its actuation of the sealed throttle actuating circuit will be described. In the modification shown in Fig. 1, a sump tank which attains a supply of oil or other fluid for actuating the control circuit is illustrated schematically in the drawing. A pair of pumps which may be driven by the engine, one being arranged to deliver constant pressure and the other being arranged to develop a pressure which is proportional to the square of engine speed are provided. The constant pressure pump discharges into the line 20 and forces fluid through the orifice O, pressure being afforded by the regulating relief valve R which by-passes line 21 to exhaust line 22. The constant pressure fluid is conducted by means of line 23 to one side of a governor circuit selector shuttle valve. The variable pressure pump discharges in the line 24 at a pressure which is proportional to the square of engine speed. A variable circuit relief valve V may be provided to limit the pressure in line 24. The flow of fluid in the variable pressure lines 24 and 24a is by-passed by a profiled portion 25 of a selector valve into an exhaust line 22a. The selector valve may be manually positioned in any convenient means to regulate the pressure of by-pass and, as will be explained presently, position of the selector valve eventually determines the speed of the turbine. The selector valve may be positioned by a condition lever, the position of which may be calibrated in terms of the condition under which the pilot wishes the plane to operate, as indicated in the drawings.

Figure 2:
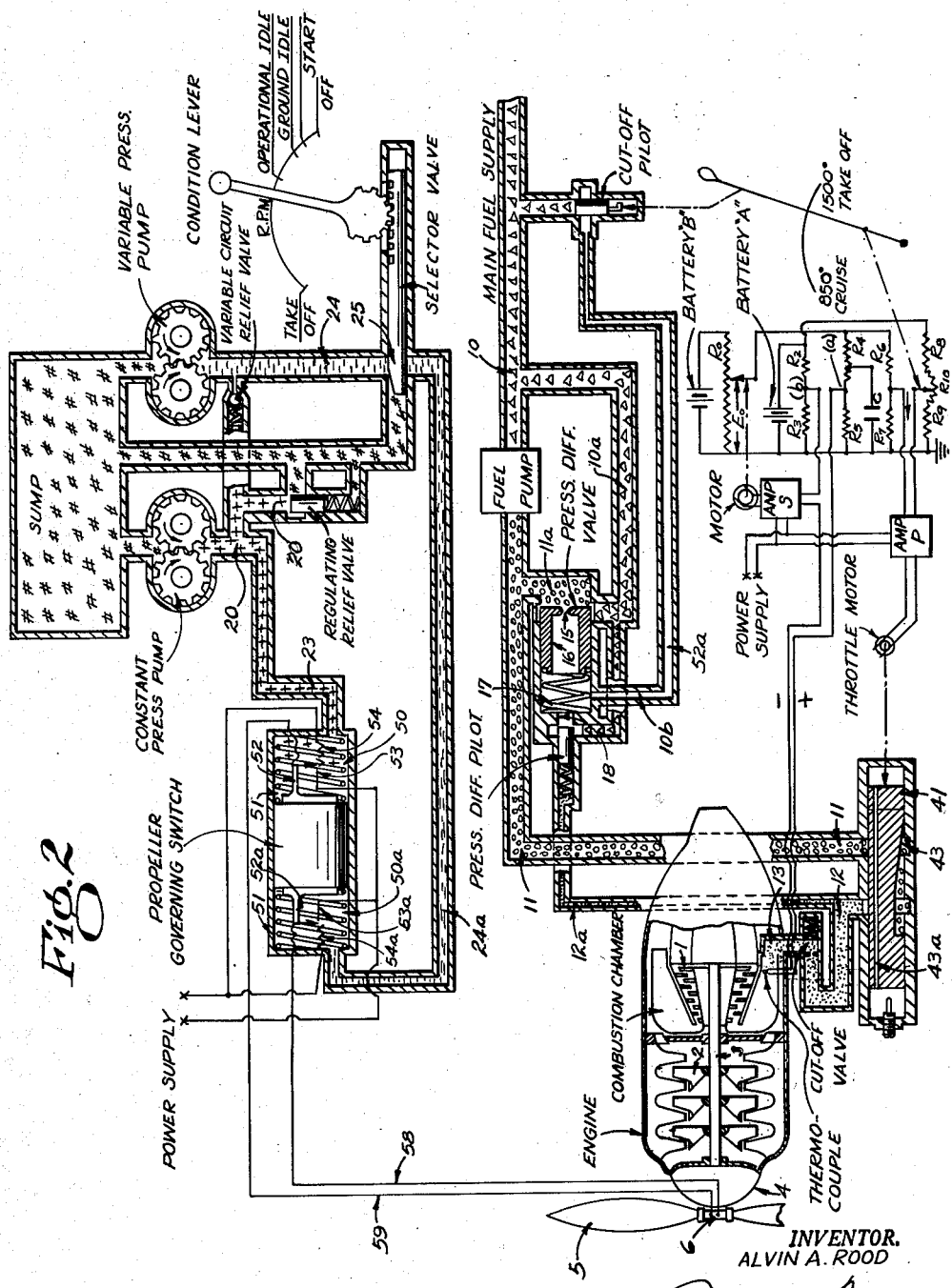
Fig. 2 is a schematic diagram of the second embodiment of my invention.
Figure 3:
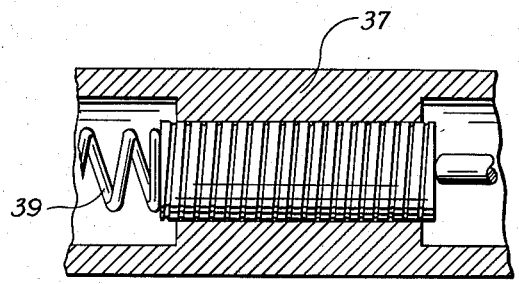
Fig. 3 is an enlarged view of the acceleration-deceleration piston shown in Fig. 1.

One side of the governor selector shuttle valve is acted upon by constant pressure in line 23 and the variable pressure in line 24a acts on the other side. Under equilibrium conditions engine speed is such that pressure in the variable line 24a equals that in constant pressure line 23 for all selector valve positions. The constant pressure fluid enters passageway 26 and may be bled into either of lines 30 or 31 which form control lines for the sealed throttle actuating circuit. The sliding sealing piston 33 transmits changes in pressure in line 30 into a sealed chamber 35 which, in turn, transmits the change in pressure to chamber 36 on one side of a piston 37 which forms an acceleration-deceleration control unit. Sealing piston 33 insures that no dirt will find its way to metering groove in piston 37. Piston 37 is slidable to a limited extent and is urged to the left by fluid pressure in chamber 36 and to the right by fluid pressure in chamber 38 and also by spring pressure 39. This piston is provided with a fine spiral groove as seen in Fig. 2 which permits a metered amount of oil flow through the piston. For example, if line 30 is opened to a source of fluid under pressure piston 33 moves left a metered quantity of oil flows into chamber 40 and exerts a force against the sealed end 41 of the profiled throttle. Conversely, if line 31 is opened to a source of fluid under pressure the other end 42 of the throttle is acted upon by pressure in chamber 32. The position of the throttle is determined by the flow of fluid in lines 30 and 31 which, in turn, depends on the position of the selector shuttle.

The acceleration and deceleration piston 37 modifies the effect somewhat in the following manner. Assume that equilibrium exists in that engine speed equals selected speed and that the manual condition lever is set for less speed. The by-pass effect of profile 25 of the selector valve is then reduced so that pressure in line 24a increases and initially exceeds that in line 23. With this increase of pressure in line 24a, the shuttle valve is moved up and chamber 26 is opened to line 30 and line 31 is connected to exhaust by line 22b. Fluid tends to flow into line 30 and pressure builds up to the right of the sealing piston 33. This increases the pressure in chamber 35 and hence in chamber 36 and tends to force fluid through the spiral groove in the piston 37. Furthermore, pressure against the end of piston 37 in chamber 36 moves the piston to the left. Motion of the piston to the left decreases the length of the restriction caused by the spiral groove, the purpose of this action being to make deceleration somewhat more rapid than acceleration, in order to prevent excessive build-up of heat in the combustion chamber. The fluid that flows through the spiral groove added to the fluid flow caused by motion of the piston 37 to the left creates additional pressure in chamber 40 which acts against the face 41 of the throttle causing it to move to the right. When this occurs the profiled portion 43 of the throttle restricts the flow of fluid into the line 12 and hence into the combustion chamber at 13. Simultaneously, fluid is displaced from chamber 32 into the exhaust so there is no hydraulic block on the throttle. As soon as engine speed drops to the selected speed, pressure in line 24a drops to equal that in line 23, but the shuttle valve may still be displaced from neutral but this merely means that the throttle overshoots to return the shuttle valve. Thus, the throttle hunts somewhat but will hunt only over a very small amplitude because of the extreme sensitivity of the speed sensing mechanism.

Once the selector valve is positioned to select a certain speed, the action of the variable pressure pump against the governor selector shuttle will continuously adjust the throttle to maintain the speed at the selected value.

The governor selector shuttle arrangement herein described makes available the full pressure in the constant pressure system for actuation of the throttle which provides a very sensitive control. No matter how small the variation in actual engine speed from selected speed may be, if that variation exists over any appreciable period of time the selector shuttle will move to connect one of the throttle control lines to full constant line pressure. This gives a positive and certain correction of very small speed variations, even though there might be some tendency for the valves to stick or even though the system might tend to be somewhat sluggish in operation. The advantages of this arrangement can be readily understood if it is compared with one wherein the pressure variations in the variable pressure line due to speed changes operate the throttle directly. If this were the case a slight variation in speed and its attendant slight variation in pressure in the variable pressure line might not be enough to break loose the throttle and move it. In my system I need only move a pilot valve which may be relatively light and free of movement, to apply full constant line pressure to actuate the throttle. Also, I can make the lands on my pilot vane or selector shuttle valve slightly wider than the ports which they close so that slight oscillatory variations in speed will not be transmitted to the throttle and cause undue hunting. However, if the slight variation in speed persists for any appreciable period of time the shuttle valve will drift over in the proper direction to correct that variation.

If a speed increase is desired the selector valve is positioned to by-pass more fluid and decrease the pressure in line 24a so that the shuttle valve is moved down. In this case fluid flows into line 31 and chamber 32, whereupon it acts upon the face 42 of the throttle to move the throttle to the left. This gives an increased fuel flow through line 12 and more fuel reaches the combustion chamber. It will also be noted that acceleration cannot be effected as quickly as deceleration because when the throttle is moved to the left it forces fluid from chamber 40 against the left end of the piston 37. This causes the piston to move to the right and imposes the full length of the spiral groove in the path of fluid transfer in chamber 39 to chamber 36. The result is that a too rapid increase of fuel flow to the combustion chamber is prevented. The deceleration adjustment shown limits the motion of the piston 37 to the left and thereby controls the amount by which the restricted orifice is in effect opened up which, in turn, controls the relative rapidity of deceleration and acceleration. Likewise, the acceleration control screw can be adjusted so that piston 37 will not move so as to present the complete spiral groove if it is desired to have more rapid acceleration.

A viscosity control heater coil is shown surrounding the piston 37 which coil is connected to the main power supply and may be controlled by a thermostat located in the oil adjacent the piston 37. With this arrangement, oil viscosity at the piston 37 and the calibration of the adjustment is maintained constant regardless of external temperatures.

A burner blowout adjustment screw 45 may be provided to limit closing of the throttle below that point where the burner will blow out. In most jet or turbine engines it is desirable to have the fuel supply cut off completely when the manual control is set to its off position and yet it is not desirable that the throttle itself be permitted to move to a position where the burner will blow out unless such a position is manually selected. This creates a problem where the throttle is controlled by a remote control or servo system, so the burner blowout screw is adjusted to prevent unselected burner blowout.

I also provide an automatic cut-off valve between the line 12 and combustion chamber at 13 which is spring-urged to a closed position by a light spring so that when the pressure in line 12 drops below a certain predetermined value, even though that pressure may not be zero, no fuel can flow into the combustion chamber. Likewise, if the condition lever is set to the off position, I provide means to completely cut off the fuel supply by connecting a cut-off pilot so that it is moved with the selector valve. In the off position of the selector valve, the cut-off pilot valve opens a line 52 to low-pressure line 10c, branching from the main fuel supply line 10. When this occurs pressure behind the constant pressure difference valve drops rapidly and that valve is moved to the left by fuel pump pressure in line 11a. This bypasses fuel pump pressure from line 11 into line 10a and back to the supply line 10. Simultaneously, pressure in the throttle outlet line 12 drops to the value at which the cut-off valve can close, so that fuel is completely cut off from the combustion chamber even though the throttle itself can never be completely closed by the servo control system.

Up to this point a fuel system has been described which, for any setting of the condition lever, maintains the speed of the turbine constant at that represented selected setting. As has been pointed out previously, it is important that some control be had over the temperature existing in the combustion chamber in order to insure that the life of the turbine will not be unduly shortened due to factors beyond the operator's control. Furthermore, as has been pointed out, merely maintaining a constant speed by regulating the fuel supply does not insure that temperature in the combustion chamber will not rise to an unduly high value or will not drop to a value wherein operation of the engine is inefficient. There are other factors which cause temperature in the combustion chamber to vary, even though speed of the turbine is held constant. For one thing, the efficiency of the turbine and hence its fuel requirements vary with the speed so that at some speeds more power is available per unit of fuel than at others. A complicated system of adjusting the fuel supply with respect to enigne efficiency and speed might be provided, but I prefer to provide means which controls the load in response to the temperature within the combustion chamber. Another factor is that of altitude. As altitude increases, engine speed to increase due to the decrease in load so that speed control valves which are adjusted manually to operate at one altitude will not necessarily function properly at other altitudes. But, depending upon whether the automatic fuel supply circuit over corrects or undercorrects, the temperature in the combustion chamber will tend to vary. With my novel combination of elements I can correct for altitude variations by providing means to adjust the load in response to changes in temperature in the combustion chamber.

In the embodiment under consideration, my load adjusting means includes a thermocouple which produces a voltage due to the temperature in the combustion chamber, a correction circuit which converts the voltage of the thermocouple to a voltage which represents the actual temperature in the combustion chamber, and means whereby the difference between this last named voltage and a voltage that represents the selected temperature changes the pitch of the propeller and hence changes the load until the temperature within the combustion chamber equals the selected temperature.

Figure 4:
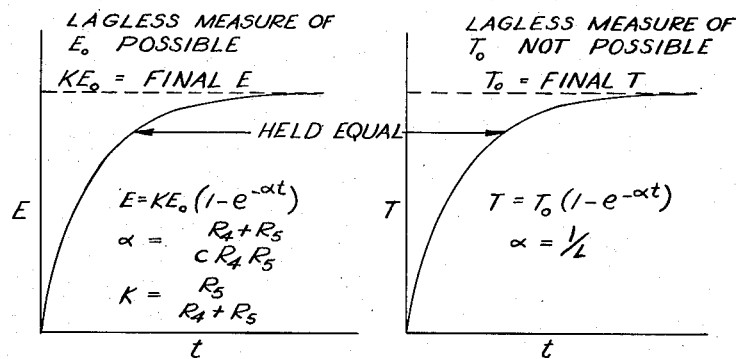
Fig. 4 is a pair of curves illustrating the principles whereby I can measure true temperature without lag.

The circuit diagram here shown is merely schematic intending to illustrate one possible means of obtaining the results described above. Fig. 5 illustrates additional details of the circuit which will be explained presently. A serious problem in attempting to regulate in terms of temperature within the combustion chamber lies in the fact that it is not possible to directly and accurately measure the absolute temperature which exists at a given time within the chamber. This difficulty arises because the voltage generated by the thermocouple is only generated because of heat transferred from the combustion chamber medium to the metal of the thermocouple. As will be understood by one familiar with the physical laws of heat transfer, there is always a certain lag or time required for any body to come up to the temperature of another body. The actual voltage generated by the thermocouple under conditions wherein the temperature within the chamber is changing never truly represents the absolute temperature therein at the time the voltage is generated. However, the voltage lag and the heat transfer characteristics can be determined and they are known to follow a certain general law as shown in the curve at the right in Fig. 4. In this curve, the false temperature T measured by the thermocouple within the chamber is plotted against lapsed time $t$ and a general expression appears under the curve which represents the manner in which the false measured temperature approaches the final or absolute temperature with the chamber $T_0$, as time $t$ elapses.

To the left of the temperature curve appears a similar curve which represents the voltage between the plates of a condenser at any given elapsed time $t$, showing how the actual voltage approaches the final voltage $E_0$ as time elapses. In a given electrical circuit, knowing the instantaneous voltage across the condenser and the circuit characteristics, it is possible to compute the final voltage $E_0$ from data taken at any given time since the voltage was changed in accordance with certain electrical laws depending upon circuits constants. It will be noticed on examination of the typical formulas given on the drawing that the voltage and temperature curves follow the same general laws. Now, it is possible to design a circuit wherein the final voltage $E_0$ can be determined based upon the instantaneous voltage E in the circuit whereas it is not possible with conventional equipment to directly determine the actual temperature $T_0$ based upon the measured temperature T at any given instant. However, applicant has devised means utilizing the properties of two circuit elements differing in transient current response to applied voltage, such as a condenser and a resistor in an electric circuit, or a resistor and an inductance, which will permit determination of the actual temperature represented by thermocouple voltage even though the measurement is subject to the lag described previously.

The thermocouple has two leads, one of which is an input to amplifier S, there being a connection from the amplifier through resistance $R_3$ to ground. The other thermocouple lead connects through resistance $R_5$ to ground. A resistance $R_4$ is in series with the resistance $R_5$ and a fixed condenser C is connected across $R_4$ and a portion of $R_5$. Since most thermocouples generate a relatively small potential difference between their terminals, even at high temperatures, a battery B is inserted in the negative side of the potentiometer circuit which raises the potential of both sides of the potentiometer. One purpose of battery B is to make it possible for the resistance $R_5$ to be of appreciable value which is highly desirable in order to prevent shorting out the thermocouple entirely, the thermocouple being low voltage, low current generator. Another function of battery B as a cold junction compensator will be described presently.

The other terminal of resistance $R_4$ connects to a movable arm of a second potentiometer $R_0$. Battery A is in series with $R_0$ the plus side being connected to the plus line of the thermocouple, namely, that side which connects to resistances $R_4$ and $R_5$ at junction $a$. The minus side of the battery as well as the corresponding end of $R_0$, connects to ground. It can be seen from the circuit described up to this point that in equilibrium conditions it is possible to move the potentiometer arm $R_0$ to a position where the voltage impressed by battery A at the junction $a$ equals the voltage impressed at that point by the thermocouple and the battery B, whereupon no current will flow in the thermocouple circuit.

As is described in detail in connection with Fig. 5, the amplifier S converts any current flow in the thermocouple circuit to a corresponding flow of current through a reversible servomotor which, by suitable mechanical gearing, is connected to move the potentiometer arm $R_0$. Thus, if there is any change of temperature in the combustion chamber, an increase, for example, the voltage impressed at junction $a$ by the thermocouple circuit will increase, which will cause current to flow in amplifier S. Amplifier S is of the type which will cause the motor to turn in a direction that depends upon the direction of current flow in the thermocouple circuit. The servomotor is connected to drive the potentiometer arm of $R_0$ towards the positive side of the battery A in case of a temperature increase, in order to increase the potential impressed by battery A at the junction $a$ of the potentiometer. Of course, when the potential from battery A at that junction equals the increased potential from the thermocouple circuit, there is no tendency for current to flow in the thermocouple circuit including the amplifier and the motor will stop.

However, the build up of potential at the junction $a$ due to battery A is delayed because current from battery A must charge condenser C through a portion of the series resistor $R_4$. This means that the voltage at the junction $a$ lags the impressed voltage $E_0$ in accordance with the characteristics of the circuit including the condenser C and its associated circuit elements. The current is such that the voltage $E_0$ which is required to rebalance the thermocouple is proportional to what the final voltage across the condenser will be when it is fully charged which final voltage, as indicated in the curves shown in Fig. 4, may be made proportional to the absolute temperature within the combustion chamber.

In order to control the propeller pitch in accordance with changes in the voltage $E_0$, which changes represent the true temperature change within the combustion chamber, amplifier P is provided. One side of the amplifier is connected through a resistor $R_8$ to the plus side of the battery B and to a grounded by-pass resistor $R_9$. This side of the amplifier is at a constant voltage determined by the resistance ratio of resistors $R_8$ and $R_9$ and the setting of potentiometer $R_{10}$, the purpose of which will be explained presently. The other side of amplifier P is connected to the potentiometer arm $R_0$ through voltage-dividing resistors $R_7$ and $R_6$. The resistance $R_7$ is of such a value that under stable equilibrium conditions, i. e., when combustion chamber temperature has remained constant for a long enough time to effect full heat transfer to the thermocouple, and with condenser C fully charged, both amplifier inputs are equal and no current flows through the amplifier inputs. The resistance $R_4$, which causes the potential $E_0$ to drop before it reaches the junction $a$, and the resistance $R_2$, which causes potential battery B to drop before it reaches the line to thermocouple, are substantially equal at a predetermined cold junction temperature. The manner in which amplifier P is connected into the circuit makes it responsive to the direction of current flow through its inputs. If the voltage from $E_0$ is greater than the fixed voltage on one side of amplifier P, input current flows in one direction, and vice versa. The amount of input current is substantially proportional to the change in voltage $E_0$ needed to balance the change in voltage at junction $a$ from the thermocouple circuit.

In order to compensate for temperature changes at the cold junction of the thermocouple, resistance $R_2$ is made to have a negative temperature coefficient relative to resistance $R_4$. For example, if the temperature of the cold junction rises above a preselected standard value, the thermocouple voltage output will decrease. But as this occurs the resistance of $R_2$ drops relative to that of $R_4$ so that there is a greater voltage drop across $R_2$ and the potential at junction $b$ drops below its previous value. This increases the potential difference between junctions $a$ and $b$ and compensates for the cold junction temperature increase. The thermocouple cold junction and the resistor $R_2$ are mounted in proximity so as to be subject to the same ambient temperature.

There is a power lever connected by gearing or suitable linkage with the arm of potentiometer $R_{10}$. This lever enables the operator to select a given absolute temperature to be maintained in the combustion chamber. It can be seen that a change in the setting of potentiometer $R_{10}$ unbalances the amplifier P which changes the load. This affects the thermocouple and its anticipator circuit so that amplifier S is energized to move potentiometer $R_0$ until the voltage $E_0$ equals the absolute temperature in the chamber. By proper calibration of $R_{10}$ and other units the power lever setting can be made to indicate the actual temperature resulting from that setting.

Continuing the explanation of the circuit, assume now that the power lever is positioned so that the arm $R_{10}$ moves to a position representing a selected temperature of 1000° F. Assume also that the temperature within the combustion chamber equals the selected value and that the equilibrium of the system has remained unchanged for a long enough period of time for the thermocouple to generate a voltage which substantially represents the actual temperature within the chamber, namely 1000° F. Under these conditions the condenser C will have had time to be completely charged, so that the voltage at junction $a$ impressed by $E_0$ will equal the voltage at $a$ produced by the thermocouple circuit. Under these conditions the voltage $E_0$ will be representative of the true temperature within the combustion chamber, i. e., 1000° F.

Now, with the condenser fully charged and the heat transfer to the thermocouple completed, assume that the temperature within the combustion chamber quickly rises to 1400° F., a condition which often occurs in internal combustion engines of this type. As soon as the combustion chamber temperature rises, the thermocouple voltage increases and amplifier S starts the servomotor driving the potentiometer arm $R_0$. This tends to increase the voltage at the junction $a$ but simultaneously, the condenser C must be further charged, which charging causes the instantaneous voltage at the junction $a$ to lag the impressed voltage $E_0$. Therefore, the voltage $E_0$ must actually be greater than the voltage increase of the thermocouple, and the change in voltage $E_0$ represents the true difference of 400° F. between the selected temperature of 1000° F. and the 1400° F. temperature now existing in the combustion chamber in the example.

As has been pointed out, due to the manner in which the amplifier P is connected into the circuit, the amplifier receives and amplifies the change in voltage of $E_0$ representing this unselected temperature difference. The rectified amplifier output controls the pitch motor in the propeller and since the temperature in the combustion chamber has risen from the selected value, the connections are such that the propeller pitch will be decreased, thereby decreasing the load on the turbine. This would tend to make the turbine run faster if it were not for the constant speed circuit, more air would be pumped and the temperature would drop. However, the constant speed circuit does not permit speed to increase, it acts to cut down the fuel supply so that even though the load is lightened the speed will remain the same. But cutting down the fuel supply will itself tend to reduce the temperature within the chamber so that the correction action will continue rapidly until the temperature within the chamber equals the selected value.

As the combustion chamber temperature drops rapidly from 1400° F. back to the selected 1000° F., the thermocouple output begins to drop, but not as rapidly. Condenser C now discharges and tends to maintain the voltage at junction $a$. Now flow in the thermocouple circuit reverses and the servomotor reverses to reduce the drive to arm $E_0$. Due to the voltage from discharging condenser, this reduction of $E_0$ must be more than enough to equal the small drop in thermocouple voltage at $a$. In fact, as the load decrease drops the combustion chamber temperature to the selected value, the lag corrector system quickly returns $E_0$ to a value representing the selected actual temperature in the chamber, namely, 1000° F., so that the inputs to amplifier P soon balance again and the propeller pitch motor stops. Simultaneously, due to lag in heat transfer from the thermocouple, its voltage may not have dropped back to the value representing 1000° F. by the time $E_0$ has been restored to its original value with amplifier P de-energized to stop the propeller pitch motor. However, condenser C will not have discharged to its previous value either, so the thermocouple cools off and the condenser discharges at the same rate, maintaining the circuit balance and holding $E_0$ at the value representing 1000° F. without energizing amplifier P and the propeller pitch motor.

To understand another phase of the lag corrector circuit operation, assume that actual temperature is at 1000° F. and a 1400° F. temperature is selected. Motion of the power lever causes junction $a$ to be moved toward $R_5$ and the voltage $E_0$ must now be decreased to balance the circuit by amplifier A and the servomotor. This energizes amplifier P and the propeller pitch motor increases the propeller pitch to bring the actual chamber temperature up to 1400° F. Now, if the actual temperature remains at 1400° F. for an appreciable period of time, the lag in the thermocouple output will gradually disappear as the 1400° F. temperature in the chamber is transmitted to the thermocouple unit and the voltage at the junction $a$ gradually increases and approaches the voltage that represents a 1400° F. temperature. However, as this happens the condenser C has been gradually charged by battery A so that voltage at the junction $a$ impressed by potential $E_0$ has also been increasing. Since the circuit constants are so selected that the rate of charge of the condenser is proportional to the rate of heat transfer to the thermocouple, these changes in thermocouple voltage and impressed voltage at junction $a$ will be equal and opposite as the system reaches equilibrium, and no further unbalance occurs in the circuit to amplifier S that controls the potentiometer servomotor.

In the situation wherein the temperature drops below the selected value the circuit works in a similar manner except that current in the potentiometer circuit initially flows through $R_3$ to ground rather than from ground through battery B and resistance $R_2$.

I may provide an 0° stop or detent for the propeller to prevent it from being driven to a negative pitch angle, and if reducing the pitch to zero does not drop the temperature sufficiently the temperature override system described below functions.

In order to protect the turbine from excessive temperatures, a temperature override solenoid is provided in the hydraulic control circuit. The valve 46 is normally held downwardly by spring 51 so that constant pressure line 23a is blocked from communication with the sump. However, the solenoid is energized by a voltage representing the absolute temperature within the chamber, the source of which voltage will be explained presently. The spring 51 is so designed that if the absolute temperature exceeds a pre-selected maximum the valve 50 is drawn up by the solenoid far enough to by-pass constant pressure line 23a to the sump. This causes the selector shuttle to move up in the diagram and connect the valve pressure line 24a to the sump line 22b by means of groove 27 in the shuttle and passageway 22c in its cylinder. When this connection is made fluid under pressure in chamber 32 to the right of the throttle is bled out from the chamber through line 31 but due to the spiral orifice in piston 37, pressure will tend to maintain in chamber 40 to the left of the throttle so that throttle will move to the right and decrease the amount of fuel through the combustion chamber and hence decrease its temperature. Orifice O is small enough to prevent the constant pressure pump from building up pressure in line 23 faster than the override valve relieves the pressure.

Due to the fact that both sides of the throttle control system are now connected to the sump, no further change in throttle position will be effected until the temperature drops back below a pre-selected maximum whereupon valve 50 will cut off the by-pass of the constant pressure line and the system will be back in normal operation.

The voltage representing the absolute temperature in the combustion chamber is obtained for energization of the temperature override solenoid by tapping across ground and potentiometer arm $R_0$ so that voltage $E_0$ is supplied to the solenoid. Of course, if selected and absolute temperature are equal, there will be no output from amplifier P and the temperature override solenoid will be energized in accordance with the selected temperature, which normally would not cause the override valve 50 to by-pass line 23a. However, if there is an unselected temperature increase, this will be sensed by the lag correcting mechanism and the new absolute temperature voltage $E_0$ will cause the solenoid to operate in case the new absolute temperature exceeds the predetermined maximum permissible value. This would occur in case the normal load adjusting mechanism drove the propeller to zero pitch and the temperature excess persisted. With this arrangement, the override solenoid protects the system against excessive temperatures which may actually exist in the combustion chamber and even though these increases are very rapid the lag corrector will quickly produce the absolute temperature for actuation of the solenoid.

The resistances such as $R_4$ and $R_5$ and the potentiometer $R_1$ are of importance in determining the characteristics of the device and their values as well as the position of junction $a$ should be adjusted so that the lag corrector accounts for the actual lag present in the thermocouple. It will be understood that one or more correcting circuits could be placed in series, each of which corrects for the temperature lag in various parts of the thermocouple installation. For example, if the thermocouple were encased in one or more protective housings each of which had different heat transfer characteristics, lag corrector circuits could be superimposed, each of which corrects for the lag in a corresponding thermocouple element.

Fig. 5 shows some additional details of how the thermocouple is connected to the amplifier and how the servomotor that drives the lag corrector potentiometer may be connected. In the figure, amplifiers S and P may be conventional voltage or power amplifiers with the required number of tubes connected in cascade. They may employ transformer inputs and outputs and resistance couplings may be used in the standard manner. I have shown a typical circuit for the amplifiers which will be recognized as containing nothing unconventional.

One method of connecting in the thermocouple is shown wherein the thermocouple is connected to a vibrating interrupter 71 which alternately makes contact with contact 72 or 73 in response to the impulses from the vibrator coil 70. Coil 70 may be connected to a high-frequency alternating current source or generator such as could be obtained from a frequency converter. The other thermocouple lead connects to the primary center tap of an input transformer 74 and the circuit is completed by the two lines 75 and 76 to the end connections of the transformer. With the circuit just described and with a voltage output of the thermocouple, it can be seen that a high-frequency current having the characteristics of an alternating current is impressed upon the input transformer 74. It can also be seen that the phase of the high-frequency current input to the amplifier is reversed if the direction of current flow in the thermocouple is reversed. It will be recalled that current flow in the thermocouple does reverse because under some conditions current flows in one direction through the thermocouple and in other conditions battery A forces current through the thermocouple in an opposite direction. To summarize, the input to the amplifier has the characteristics of an alternating current which will either be in phase with the high-frequency source or out of phase with the source depending upon the direction of current flow through the thermocouple.

The secondary current from transformer 74 is amplified in vacuum tubes $T_1$, $T_2$ and $T_3$ and the amplified current is taken off at output transformer 77. The vacuum tubes $T_4$ and $T_5$ are connected to the output of the amplifier and to the high-frequency A. C. supply which acts as a reference voltage in order to operate as a phase discriminator circuit and control the direction of the servomotor according to the polarity of the thermocouple leads. $R_{20}$ is the cathode bias resistor and the grids of the tubes are connected to opposite ends of transformer 77. Plates of the tube connect by means of leads 80 and 81 to the fields $F_1$ and $F_2$ of a split phase A. C. servomotor. Condenser $C_2$ may be employed in the usual manner to make current in one field lead that in the other so as to permit single phase operation of the motor. The operation of the circuit is as follows. Assume that lead 68 of the thermocouple is plus and that lead 66 of the high-frequency A. C. source is plus and line 67 is minus at the same time. Assume also that the circuit elements in the amplifier operate so that the output to the grid of vacuum tube $T_4$ in the servomotor circuit is plus and that to the grid of $T_5$ is minus. Now, under these conditions it can be seen that the grid of vacuum tube $T_4$ tends to trigger the tube but since line 67 of the A. C. reference voltage is minus, both plates are minus and neither tube will conduct current. Now, a half cycle later the vibrating arm 71 will move to the other position and the polarity of the amplifier output will reverse making the input to the grid of $T_4$ minus and that to the grid of $T_5$ plus. Simultaneously the A. C. reference voltage will reverse making line 67 and the tube plates plus. Now, $T_5$ is in condition to conduct current because its grid input is plus and its plate voltage is plus. Current flows in line 81 of the servomotor circuit and the motor tends to run in one direction. Tube $T_4$ is not in condition to conduct a current because its grid input is minus. Thus, as long as the polarity of the thermocouple remains unchanged the output of the servomotor circuit will be a pulsating current always flowing in one direction through the field windings of the motor. Assume now that the thermocouple polarity reverses. Since a fixed reference voltage is provided by the high-frequency A. C. supply, this means that the conditions just described will be reversed and when the polarity of the reference voltage line 67 is plus tube $T_4$ will have a positive grid input, the tube will conduct current and the motor will run in the opposite direction. Thus, the combination of the reversible input from the thermocouple, the high-frequency alternating current vibrator, and the reference voltage produces a phase discrimination circuit which will cause the motor to run in a direction according to the polarity of the thermocouple leads. I contemplate that other suitable devices may be substituted for the vibrating contact arm 71 such as a double-acting carbon microphone or its electric equivalent.

Amplifier P for the propeller pitch motor may be similar to that of amplifier S having a transformer input at 85 and multi-stage vacuum tube amplification indicating the tubes $T_6$, $T_7$ and $T_8$. The output transformer 86 may feed into a rectifier to produce full or half wave pulsating direct current. It may or may not employ a filter to smooth out the output of the rectifier. I have illustrated symbolically a copper oxide rectifier but it is understood that any suitable full or half wave rectifier may be employed. The output of the amplifier P is fed to the propeller pitch motor as described previously and voltage $E_0$ representing absolute temperature is provided for the temperature override solenoid as mentioned in the previous description.

In the modification shown in Fig. 2, results similar to those described in the first embodiment are attained except the hydraulic and electric circuits are interchanged in such a manner that the hydraulic system regulates the load to hold a selected turbine speed, whereas the temperature measuring and lag correction system regulate the fuel supply to maintain a selected absolute temperature in the combustion chamber. The constant and variable pressure pumps and associated regulators, and the action of the selector valve is like that in the previously described form. However, instead of connecting the constant and variable pressure lines to a selector shuttle valve, they connect to opposite ends of an electro-hydraulic piston assembly which I refer to as the propeller governing switch. The constant pressure line 23 communicates with a chamber 50 on one side of the propeller governor switch and line 24a connects to chamber 50a on the other side thereof. It will be remembered that under equilibrium conditions the speed of the engine automatically attains such a value that the pressure in line 24a equals that in line 23, and the turbine speed necessary to cause such equalization of pressures is determined by the position of the speed selector valve. Normally, the propeller governor switch is centered in its cylinder and a pair of opposed springs 51 tend to keep the switch in its neutral position. Each end of the switch has an arm or other support means 52 and 52a respectively which carry the movable arm of variable resistance shown schematically in the drawing. Each resistance 52 and 52a is connected to one input of the propeller pitch changing motor. In order that direction of flow to the motor will be such as to effect the necessary increase or decrease in load and in order that the amount of current flow to the propeller motor will depend upon the amount of variation between the actual speed and the selected speed, a pair of resistances are provided in the governing switch and illustrated schematically in the drawings. The pair of resistances 54 and 54a are connected together to one side of the power supply and each of the resistances may be engaged by its associated arm 52 and 52a, respectively, depending upon which way the piston is moved from neutral. A pair of stationary contact members 53 and 53a are also in position so that one of these members is engaged by the arm 52 or 52a depending upon which way the switch is off neutral, in order to complete the circuit. These fixed contact members are connected together and to the other side of the power supply. There is a small dead space at neutral to keep very small variations in speed from energizing the propeller pitch motor.

The governor switch acts as follows: Assume that a speed has been selected and that turbine speed becomes greater than the selected speed. In this case pressure in line 24a will exceed that in the constant pressure line 23 and the switch will move to the right. This will cause arm 52a to connect to engage the fixed contact 53a so that line 58 leading to the propeller motor will be connected to the power supply. The other arm 52 will engage the resistance 54 thereby connecting line 59 from the motor to the other power supply line but through the resistance 54. The greater the displacement of the switch piston the less resistance there will be in the circuit and the more the motor will be energized. When this occurs in the assumption made, the propeller pitch will be increased, increasing the load and causing the turbine to slow down until actual and selected speeds are equal. As this occurs pressure in line 24a gradually drops until it again equals pressure in the constant pressure line 23, whereupon the governor switch piston is restored to its neutral position and the pitch governing motor is de-energized.

The electric temperature circuit controls the throttle in response to absolute temperature within the combustion chamber in order to maintain that temperature at a pre-selected value regardless of the speed of the turbine. The electric connections of this circuit are similar to those described previously insofar as the thermocouple and lag correction circuits are concerned and a detailed description thereof will not be repeated here. However, instead of connecting the output of amplifier P to control the propeller pitch governing motor as in the first modification, the output of amplifier B energizes and regulates the action of a servomotor which positions the throttle. The throttle is similar to that shown in the previous modification except that a through passageway 43 is provided so that there will be no fluid block at either end of the throttle to prevent its being positioned by the motor. There is a constant pressure drop system operating in conjunction with the throttle inlet and outlet which functions like that previously described. With the arrangement shown, it can be seen that if the temperature in the combustion chamber increases from the pre-selected value, the lag correction mechanism will measure the true difference in temperature between the selected temperature and the absolute temperature and will cause the throttle motor to decrease the fuel flow into the combustion chamber until temperature therein drops back to the selected value.

There is a cut-off pilot which is connected to the temperature control lever so that when this temperature lever is set for temperature below a certain value, line 52a is opened to inlet pressure and the constant pressure difference valve by-passes the fuel pump output causing the cut-off valve in line 13 to spring shut and prevent further flow of fuel into the combustion chamber. It will be understood that the arrangement shown in the second modification has all the advantages as that previously described in that automatic compensation for altitude differences and engine efficiency is effected. Likewise, this modification permits the operator to maintain control of the combustion chamber temperature accurately and without lag at all times. I contemplate that the cut-off pilot could be connected to the condition lever instead of to the temperature control lever in order to cause the fuel supply to shut off at a certain minimum speed.

I also contemplate that the lag corrector circuit could employ an inductance circuit in which case current flow would be the criterion rather than voltage as when a condenser is used. It is common knowledge that an inductance circuit can replace a capacitance circuit, these being mere electrical equivalents when properly connected.

Having thus described the present invention so that others skilled in the art may be able to understand and practice the same, I state that what I desire to secure by Letters Patent is defined in what is claimed.

I claim:

In combination with an internal combustion engine having a combustion chamber, a variable load driven by said engine, means to vary said load, a speed responsive and a constant pressure pump driven by said engine, remote control means including a floating piston throttle for regulating the fuel supply to hold engine speed constant, a floating piston shuttle valve connected to said pumps so as to move from neutral in response to pressure differences between the pumps, said shuttle valve also having means for connecting one end of said throttle to a source of fluid pressure and the other end to exhaust depending upon the direction of motion of said shuttle valve from neutral, means associated with said speed responsive pump to give a manual speed selection by changing the output of said speed responsive pump at a given engine speed, means to measure combustion chamber temperature, means responsive to combustion chamber temperature for regulating the load on said engine to hold combustion chamber temperature constant, and means associated with said temperature responsive means to give a manual temperature selection.

ALVIN A. ROOD.

REFERENCES CITED

The following references are of record in the file of this patent:

UNITED STATES PATENTS

| Number | Name | Date |
|---|---|---|
| 1,489,644 | Luscombe | Apr. 8, 1924 |
| 1,566,995 | Standerwick | Dec. 22, 1925 |
| 1,621,396 | Collins | Mar. 15, 1927 |
| 2,219,994 | Jung | Oct. 29, 1940 |
| 2,316,240 | Harrison | Apr. 13, 1943 |
| 2,336,232 | Doran | Dec. 7, 1943 |
| 2,405,888 | Holley | Aug. 13, 1946 |
| 2,432,177 | Sédille | Dec. 9, 1947 |
| 2,457,595 | Orr | Dec. 28, 1948 |
| 2,499,144 | Jarvis | Feb. 28, 1950 |
| 2,539,089 | Lear | Jan. 23, 1951 |